United States Patent [19]

Mayer et al.

[11] 4,300,595
[45] Nov. 17, 1981

[54] SOLENOID CONTROL VALVE

[75] Inventors: Endre A. Mayer, Birmingham; Charles R. Kelso, Farmington Hills, both of Mich.

[73] Assignee: The Bendix Corporation, Southfield, Mich.

[21] Appl. No.: 98,269

[22] Filed: Nov. 28, 1979

[51] Int. Cl.³ .................... F16K 31/06; F16K 1/34
[52] U.S. Cl. ............................ 137/625.33; 251/129
[58] Field of Search .................. 137/625.33; 251/129

[56] References Cited

U.S. PATENT DOCUMENTS

| | | | |
|---|---|---|---|
| 2,771,248 | 11/1956 | Ehlke | 137/625.33 X |
| 2,838,068 | 6/1958 | Ray | 137/625.33 X |
| 3,334,896 | 8/1967 | Mullin | 137/625.33 X |
| 3,517,697 | 6/1970 | Hott, Jr. et al. | 137/625.33 |

FOREIGN PATENT DOCUMENTS 731480  4/1966  Canada ......................... 137/625.33

*Primary Examiner*—Arnold Rosenthal
*Attorney, Agent, or Firm*—Markell Seitzman; Russel C. Wells

[57] ABSTRACT

An electromagnetic control valve (20) having a protective ported housing (22, 24, 32) and an electromagnet (70) and a reciprocatively situated armature (90) located therein. The control valve (20) further has a movable valve plate (160) and stationary valve seat (110) operatively connected to the armature (90) and situated within a passage (40) to control the flow of fluid therethrough. The valve seat (110) includes a plurality of circularly spaced fluid receiving passages (146) and a single annular fluid exit passage (148). The valve plate (160) has a like plurality of circularly spaced passages (170) located in a mating surface (162) adapted to mate with a corresponding surface (142) of the valve seat (110) and to seal off the flow of fluid through the valve seat.

6 Claims, 7 Drawing Figures

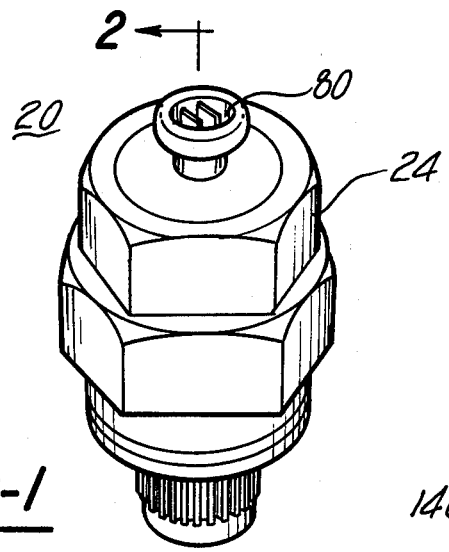
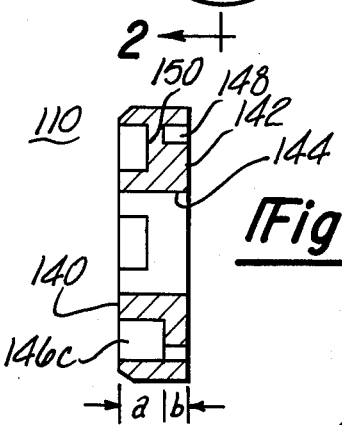
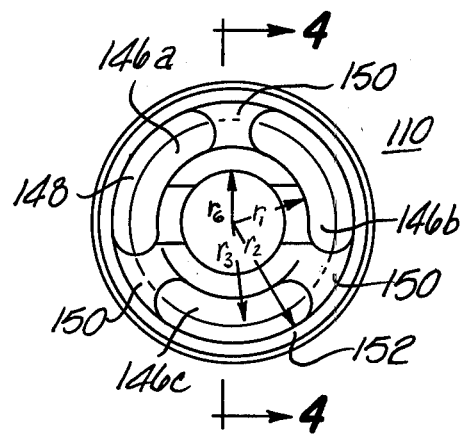
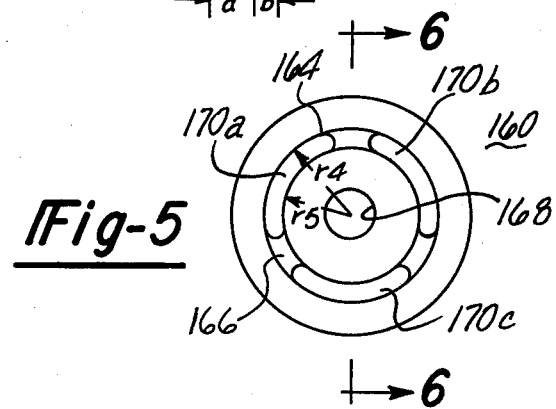
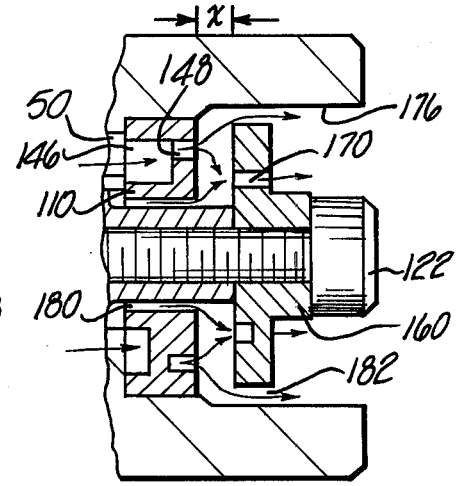

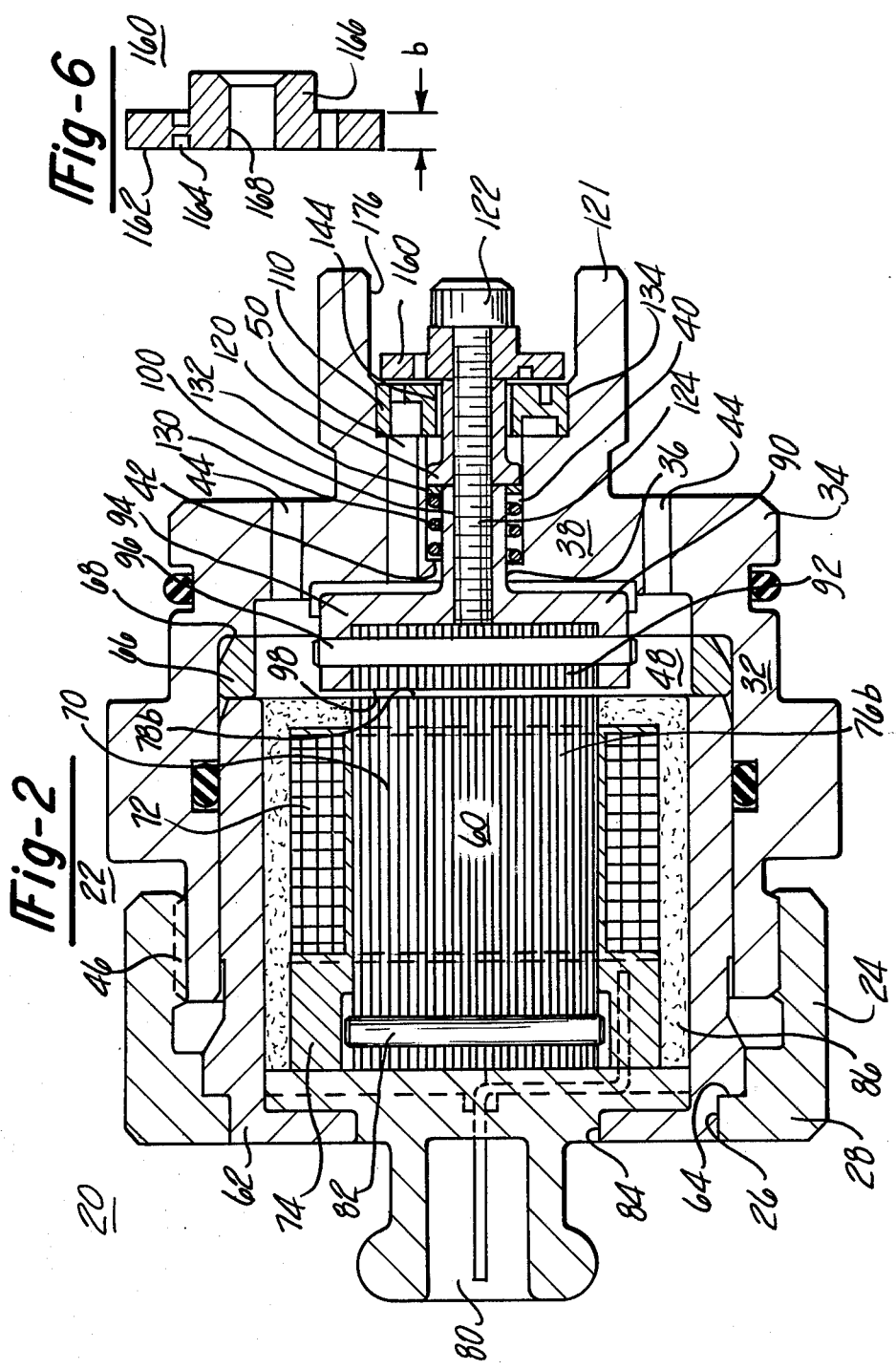

SOLENOID CONTROL VALVE

BACKGROUND OF THE INVENTION

This invention relates to valves which may be characterized as having a short stroke and high volumetric flow capability. More particularly, the invention relates to electromagnetically actuated valves having a multi-orifice valving means to controllably open and close a plurality of fluid flow passages therein.

Electromagnetically actuated valves often comprise a housing having at least one fluid flow passage therein and contain an electromagnet and a movable armature which is maintained in a variable spaced relationship relative to the electromagnet. These valves often contain a valving means comprising a stationary valve seat and a valve plate operatively connected to and movable with the armature to controllably open and close a single fluid flow passage in the valve plate in response to the command signals input to the electromagnet. It is highly advantageous to have a valve that has a short stroke (ie limited armature movement) and a high fluid flow capability. The high flow capability implies the use of a large flow area associated with the valving means. As an example consider a valve that has a longitudinal stroke of length, x, and is further characterized as having a circular fluid flow passage of radius, r, in its valve seat. It can be shown that the flow area, that is the circumscribing area surrounding the perimeter of the flow passage between the valve seat and the valve seat is $2\pi rx$. High flow areas can be achieved by increasing the radius r. The distinct disadvantage of increasing the flow area in this manner is that as the size of the opening is increased the area remaining for sealing is substantially reduced. This reduced sealing area in concert with large fluid pressure forces encourages deformation of the sealing area which in turn increases leakage flow. Furthermore by increasing the dimensions of the fluid flow passage and hence decreasing the remaining structure the strength of the valve seat is reduced.

SUMMARY OF THE INVENTION

The invention solves the deficiencies of the prior art and is an electromagnetically controlled valve responsive to commands for controlling the flow of fluid through a corresponding passage, and includes a housing that is in communication with a source of fluid. The housing includes a first port and a first passage in controlled mutual fluid communication with one another. In addition, the control valve comprises an electromagnetic circuit which includes an electromagnet and a spaced armature that is slidably received within the first passage. The control valve further includes a multi-orifice valve, connected to the armature, which comprises means for splitting the fluid flow into a plurality of fluid flow paths and for increasing the flow area and a sealing means for selectively sealing the flow in correspondence with the motion of the armature. In addition, the control valve includes a spring for biasing the armature apart from the electromagnet in the absence of control signals. An alternate embodiment of the invetion would utilize a spring to hold the valve seat against the valve plate during unactivated periods and causes the valve to open in response to the magnetic field developed during activated periods.

It is an object of the present invention to provide an electromagnetic control valve having a short stroke, a fast opening and closing response and the capability of delivering high fluid flow. It is a further object of the present invention to develop a seal that is not subject to cavitation errosion. It is a further object of the present invention to provide a seal characterized as having a low per unit area force loading.

One feature of the present invention which permits the attainment of the above objectives is a flat valve plate having a plurality of symmetrically situated apertures and a coacting valve seat, having a like plurality of apertures wherein each set of apertures is not in registration with the other. A particular advantage achieved by the interaction of these apertures is the high fluid flow achieved as a direct result of the increased fluid flow area.

These and other features, objects and advantages of the present invention will become apparent upon a reading of the detailed description.

BRIEF DESCRIPTION OF THE DRAWINGS

FIG. 1 is a perspective view of an electromagnetic control valve incorporating the teachings of the invention;

FIG. 2 is a sectional view taken through section 2—2 of FIG. 1.

FIG. 3 is a top view of the valve plate.

FIG. 4 is a sectional view of the valve plate taken through section 4—4.

FIG. 5 is a top view of the valve seat.

FIG. 6 is a sectional view of the valve seat taken through section 6—6.

FIG. 7 is an enlarged sectional view of the valve plate ad valve seat shown in FIG. 2.

DETAILED DESCRIPTION OF THE DRAWINGS

Reference is made to FIG. 1 which illustrates a perspective view of an electromagnetic control valve 20 incorporating the teachings of the present invention. FIG. 2 is a sectional view taken through section 2—2 and further illustrates the interrelationship of a number of primary components of the present invention. The control valve 20 utilizes a multi-section housing 22 which includes a first cup-like member or stator housing assembly 24 having a centrally located aperture 26 located within its bottom 28. The housing 22 further includes a second cup-like member or armature receiving assembly 32 having a bottom 34, having a centrally located passage 36 located therethrough. In addition, the armature receiving assembly 32 further includes a tubular portion 38 extending from an outer surface of the bottom. The tubular portion 38 includes a centrally located bore 40 that is preferably coaxially situated relative to passage 36. Bore 36 extends partially through the bottom 34 to form a shoulder 42 at the intersection of passage 36 with bore 40. The armature receiving assembly 32 further includes at least one port 44 which may be located through the bottom 34 to communicate fluid from a fluid source (not shown) into and out of the interior of the cup-like armature receiving assembly 32. The stator receiving assembly 24 and the armature assembly 32 may be threadably engaged one to the other by the screw threads 46 forming a chamber 48 therebetween.

The electromagnetic control valve 20 further includes an electromagnetic assembly 60 comprising a cup-like sleeve 62 sized to fit within assemblies 24 and 32. Sleeve 62 is maintained in a pressed engagement between a shoulder 64 located proximate to the bottom 28 of the stator receiving assembly 24 and a spacer ring 66 which is adapted to sit upon shoulder 68 which is fabricated as part of the interior portion of the bottom 34 of the armature receiving assembly 32. The electromagnetic assembly 60 further includes a electromagnet 70 which is preferrably a laminated E-type electromagnet having a core that is fabricated from one of the known high silicon oriented magnetic steels. The electromagnet 70 further includes at least one coil of wire 72 which is wound about a suitable bobbin 74. The bobbin 74 and coil 72 are adapted to slidably fit over the center leg 76b of the electromagnet 70. Those skilled in the art will appreciate that the E-type electromagnet has three legs 76a-c having pole faces 78a-c even though only the center leg 76b and pole face 78b are shown in FIG. 2.

The individual electromagnet laminates can be secured one to the other in a known manner such as by using a suitable epoxy (not shown). In addition, the laminates may be further secured one to the other by a locating pin 82. The electromagnetic assembly 60 further includes a connector 80 adapted to be in electrical communication with the coil 72. The connector 80 is fabricated to fit, after assembly, through the centrally located opening 84 which is located in the bottom of the sleeve 62. The electromagnet 70 connector 80, bobbin 74, and coil 72 may be secured within sleeve 62 by a suitable potting compound 86.

The electromagnetic control valve 20 further includes an armature 90 which includes a magnetically attractable pole piece 92 that is preferrably fabricated using the silicon oriented laminates. The pole piece 92 can be secured within a holding member 94 by a locating pin 96. The pole piece 92 has a pole face 98 which is maintained in the absence of electric command signals apart from and parallel to the opposing faces of each of the three legs of the E-type electromagnet. In the embodiment shown in FIG. 2, the pole piece 92 has a generally rectangular shape to comport with the generally rectangular shape formed by the pole faces 78 of the E-type electromagnet 70. The holding member 94 further includes a tubular portion 100 extending oppositely from the pole piece 92 and sized to be received within passage 36 and extend into bore 40. A valve seat 110 having a centrally located passage 144 coaxial to passage 36 and to bore 40 is maintained in press-fit engagement with a portion of the tubular portion 38 i.e. bore 134. A piston 120 is slidably received through passage 40. The piston 120 is operatively connected to the holding member 94 of the armature 90 by cap screw 122 which is threadably received within the threads 124 located within the interior of the tubular section 100. The armature 90 is maintained biased apart from the electromagnet 70 by the interaction of a spring 130 which has one end seated upon shoulder 42 and another end pressing against a washer-like spacer 132 which is sandwiched between the other end of the spring 130 and the base of the piston 120. The electromagnetic control valve 20 further includes a valve plate 160 that is operatively connected between the piston 120 and cap screw 122 and which is moveable with the armature 90. It should be noted that to increase the speed of response of the control valve 20, it is preferrable to reduce the mass of the movable members and also to reduce electromagnetic hysteresis effects. This is accomplished by fabricating the holding member 94 of a non-magnetic material such as plastic or aluminum. To insure the proper seating of the valve plate 160 to the valve seat 110 and to protect the electromagnetic laminates of electromagnet 70 and pole piece 92 from damage, the dimensions of the armature 90 are chosen so that when the valve plate 160 and valve set 110 abut one another the pole face 98 is maintained close to yet apart from the coacting pole faces 78a-c of each leg 76 of electromagnet 70. In addition as can be seen from FIG. 2, that the outward motion of the valve plate 160 ceases when the holding member 94 bottoms against the housing 38.

Reference is now made to FIGS. 3 and 4 which illustrate a top view and sectional view of the valve seat 110. In particular the valve seat 110 is a disc-like structure conforming to the shape of bore 134. In the embodiment shown the valve seat 110 is a circular disc. The valve seat 110 has a substantially flat upper surface 140 and lower surface 142. In addition, valve seat 110 contains a centrally located passage 144 having a diameter $2r_6$, which is sized to loosely receive that portion of piston 120 extending therethrough. The valve seat 110 further contains a plurality of symmetrically spaced fluid receiving passages such as the plurality of oval shaped fluid receiving passages 146 a-c which extend partially therethrough. The preferred embodiment incorporates three such annularly spaced fluid receiving passages each spaced so that their respective centers are 120° apart from each other. It should be appreciated, however, that this symmetrical orientation is but one means of practicing the present invention. It can be seen from FIG. 3 that the width of each fluid receiving passage 146 may be defined as the difference between the radii $(r_2-r_1)$. In addition, the valve seat 110 contains a single annular fluid exit groove or passage 148 located on the lower surface 142 of the valve seat 110. The depth "a" of the fluid receiving passages 146 a-c, and the depth "b" of the annular fluid exit groove or passage 148 are chosen so that the lower extremes of each intercept each other thereby providing a flow-through for fluid from the upper surface 140 through to the lower surface 142. To maintain the structural integrity of the valve seat 110 it is constructed with a plurality of web-like structures 150 linking each spaced fluid receiving passage to the outer rim 152 of the valve 110.

Reference is now made to FIGS. 5 and 6 which illustrate a sectional view of the valve plate 160. The valve plate 160 is a disc-like structure having a flat upper surface 162 with a circular groove 164 located therein which partially extends through the width "b" of the valve plate 160. The rear surface of the valve plate 160 contains a upraised boss 166 to strengthen and stiffen the valve plate 160. The valve plate 160 further contains a centrally located bore 168 extending therethrough. To maintain the structural integrity of the valve plate 160 it is constructed with a plurality of web-like structures 166 linking the walls of groove 164 forming a plurality of symmetrically spaced fluid passages 170 a-c therein. In the preferred embodiment the valve plate 160 contains three of such passages 170 which are equally spaced 164 along a common circle and extend through the valve plate 160 from the lower extremes of the groove 164. An object of the invention is to provide a large flow area and a correspondingly high seating area. This is accomplished in the preferred embodiment by maintaining the maximum radius $r_4$ of the fluid passages 170 to be less than the minimum radius $r_3$ of the annular fluid passage 148 and by providing that upon assembly passages 170 and passages 148 do not overlap. Furthermore it can be shown that if the control valve 20 has a stroke of length x the flow area achieved is approximately $2\pi(r_2+r_4+r_6)$. This flow area relationship can be obtained from FIG. 7.

It should be noted that after assembly of the valve plate 160 and the valve seat 110 within the tubular portion 38 of the housing, the lower surface 142 of the valve seat 110 will mate with the upper surface 164 of the valve plate 160. By orienting the flow passages 170 relative to the fluid exit passage 148 as described above, it can be seen that a substantial sealing area will exist in each of the surfaces 162 and 142 respectively to ensure the proper mating of the valve plate 160 to the valve seat 110. The enlarged contact area between these two surfaces reduces the unit force loading which in turn reduces the possibility of deformating the sealing areas yielding improved leakage characteristics and an increased lifetime for the fluid seal created therebetween.

Reference is again made to FIG. 2 and to FIG. 7. FIG. 7 is an enlargement of the valve end of FIG. 2 and more clearly illustrates the plurality of fluid flow paths through the valve 20. FIGS. 2 and 7 illustrate the valve 20 in an open condition permitting fluid to flow therethrough. Fluid is received, from a fluid source (not shown), into the valve 20 by the ports 44. This received fluid enters chamber 48, flows through passages 50 and is communicated to the receiving passages 146 of the valve plate 110 and to the annulus 180 formed between passage 144 and piston 120. The preferred embodiment employs three such passages 50 to communicate fluid from chamber 48 to the valve seat 110 even though only one of such passages 50 is discernible from the sectional views of FIGS. 2 and 7. The fluid flow paths created by the cooperation of the valve plate 160 and valve seat 110 can be seen from the following: The fluid exiting passage 148 and annulus 180 will enter and fill the space 184 between the valve seat 110 and valve plate 160. A portion of this fluid will exit the valve 20 through the annulus 182 formed between the valve plate 160 and passage 176, consequently a flow path may be visualized as existing between passage 148 and annulus 182. Another flow path exists for fluid flowing from passage 148 through passage 170. Still another flow path may be defined by the path created for fluid from annulus 180 through passages 170. Fluid will continue to flow through valve 20 until the valve 20 is placed in its closed state. The valve 20 will close in response to command signals sent from a controller (not shown) to the connector 80 of the electromagnetic 70 thereby producing a magnetic field. The magnetic field will attract the laminated pole piece 92 of the holding member 94 therein initiating a reciprocating motion of the piston 120. The piston 120 will move the valve plate 110 toward the electromagnet 70 until the valve seat 110 and valve plate 160 contact one another. At this point in time, the mating surfaces of the valve seat and valve plate, in particular surfaces 142 and 162 form a seal therebetween terminating the flow of fluid.

It should be appreciated that the above described control valve 20 is bi-directional, that is, fluid can be introduced at the valve plate 160 and caused to flow in a controlled manner through the housing 22 and out of the at least one port 44. A further embodiment of the invention can be realized by connecting the armature 90 to the valve seat 110 rather than the valve plate 110.

Many changes and modifications in the above described embodiment of the invention can of course be carried out without departing from the scope thereof. According that scope is intended to be limited only by the scope of the appended claims.

Having thus described the invention what is claimed is:

1. A valve responsive to command signals for controlling the flow of fluid therethrough comprising:
   a housing in communication with a source of the fluid having a first port and a first passage extending therethrough;
   first means for reciprocally moving within the first passage;
   flow splitting means situated in the first passage for dividing the flow of fluid into a plurality of flow paths wherein said flow splitting means comprises a valve seat including a first surface and a parallel spaced second surface and further has located in the first surface a first plurality of radially spaced grooves partially extending therethrough, and includes on the second surface a coaxially situated annular groove intersecting the inner portion of each of the plurality of grooves; and
   sealing means loosely received within the passage and spaced from the flow splitting means for selectively sealing the flow through the flow splitting means in correspondence with the motion of the first means, wherein said sealing means comprises a valve seat operatively connected to and movable with the first means and has an upper surface thereon for providing a fluid tight seal against the second surface of the valve seat for permitting fluid to flow through the first plurality of grooves in correspondence with the motion of the first means.

2. The valve as recited in claim 1 wherein said valve plate comprises:
   a lower surface spaced apart from the upper surface and a second plurality of radially spaced grooves located on the upper surface and extending through the lower surface.

3. The valve as recited in claim 2 wherein the first means includes:
   an electromagnet responsive to command signals input thereto disposed within the housing apart from the first passage;
   an armature responsive to the magnetic field of the electromagnetic movably situated within the housing and having a portion slidably received within the first passage;
   a piston slidably disposed in the first passage and operatively attached to the armature and to said sealing mean; and
   spring means for biasing the armature apart from the electromagnet in the absence of control signals.

4. The valve as recited in claim 3 wherein said valve seat further contains a passage sized to loosely receive said piston forming an addition flow path there between.

5. A multi-orifice valve having open and closed modes of operation in fluid communication with a source of fluid comprising:
   flow splitting means for dividing the fluid into a plurality of fluid flow paths during the open mode;
   sealing means for selectively permitting fluid to flow through the flow splitting means;
   said flow splitting means includes a valve seat having a first surface and a spaced second surface and a first plurality of spaced apertures extending therethrough;
   said sealing means includes a valve plate having an upper surface, oppositely situated and spaced relative to the second surface, and a lower surface and a second plurality of apertures extending therethrough, wherein the second plurality of apertures is not in registration with any portion of the first plurality of apertures when the upper surface is abutting the second surface during the closed mode; and wherein the first plurality of apertures includes a first annular groove in the first surface which partially extends through the valve seat and has located within the first annular groove a plurality of webs joining the outer and inner radii of the first annular groove and further having located in the second surface a second annular groove in fluid communication with the first annular groove.

6. The valve as recited in claim 5 wherein the second plurality of apertures includes a third annular groove located in the upper surface which partially extends through the valve plate and has located within the third annular groove a plurality of webs joining the outer and inner radii of the third annular groove and further having located in the lower surface a fourth annular groove in fluid communication with the third annular groove.

* * * * *